UNITED STATES PATENT OFFICE 2,645,644

THIENYL HALOSILANES

Philip A. Di Giorgio, Schenectady, N. Y., now by change of name Philip D. George, assignor to General Electric Company, a corporation of New York No Drawing. Application June 25, 1949, Serial No. 101,483

1 Claim. (Cl. 260—329)

This invention is concerned with organosilicon compositions. More particularly, the invention relates to hydrolyzable organosilanes containing a silicon-bonded thienyl

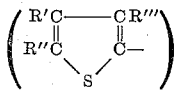

radical, and corresponding to the general formula

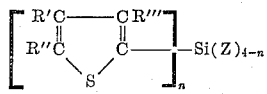

where R', R'' and R''' are members selected from the class consisting of hydrogen, monovalent hydrocarbon radicals, and halogens, Z is a silicon-bonded hydrolyzable member selected from the class consisting of halogens and alkoxy radicals of the formula OR, where R is a monovalent saturated aliphatic hydrocarbon radical, and $n$ is an integer equal to from 1 to 3, inclusive. Preferably R', R'' and R''' are hydrogen atoms so that the general formula will correspond to

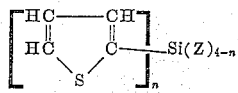

where Z and $n$ have the meanings given above.

The hydrolyzable thienyl-substituted silanes described above may be employed for rendering materials water-repellent which were originally non-water-repellent, and may be used as intermediates in the preparation of thienyl-substituted polysiloxanes.

In the above formula R', R'', and R''', in addition to hydrogen and halogens (e. g., chlorine, bromine, etc.), may be an aliphatic radical (e. g., methyl, ethyl, propyl, butyl, isobutyl, hexyl, decyl, vinyl, allyl, butadienyl, etc., radicals), aryl radical (e. g., phenyl, diphenyl, anthracyl, naphthyl, etc., radicals), alkaryl radical (e. g., tolyl, xylyl, ethylphenyl, etc., radicals), aralkyl radicals (e. g., benzyl, phenylethyl, etc., radicals), cycloaliphatic radicals (e. g., cyclohexyl, cyclopentyl, cyclohexenyl, cyclopentadienyl, etc., radicals), etc.

Examples of Z when the latter is a halogen include, for instance, chlorine, bromine, fluorine, etc. When Z is an alkoxy radical of the formula OR, R may be, for instance, the methyl, ethyl, propyl, isopropyl, butyl, isobutyl, amyl, octyl, 2-ethylhexyl, decyl, etc., radicals.

In the discussion below directed to making the claimed silanes, illustration will be confined to the thienyl derivatives containing a 2-thienyl radical

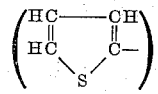

However, I do not intend to be limited to this, since, as will be apparent to those skilled in the art, other substituted thienyl derivatives are also included within the scope of my claimed invention.

One method for making the thienyl halogenosilanes comprises effecting reaction between a thienyl Grignard with a silicon tetrahalide. More particularly, one may effect reaction, for example, between 2-thienyl magnesium bromide and silicon tetrachloride in varying molar proportions depending upon the number of thienyl groups it is desired to substitute on a silicon atom in place of the silicon-bonded chlorine atom. It will, of course, be apparent to those skilled in the art that instead of silicon tetrachloride, one may employ, for instance, $SiBr_4$, $SiF_4$, etc.

In preparing the thienyl alkoxysilanes, one may react, for example, a thienyl Grignard, for instance, 2-thienyl magnesium bromide with a tetraalkoxysilane corresponding to the general formula $(RO)_4Si$ where R is a monovalent saturated aliphatic hydrocarbon radical, many examples of which were given before as, for instance, $(C_2H_5O)_4Si$. By varying the molar ratio of the thienyl metallic compound (thienyl lithium halides may also be employed) and the tetraalkoxysilane, it is possible to obtain the various alkoxy thienyl derivatives embraced by the above-identified formula.

It will, of course, be apparent that the thienyl-alkoxysilanes may also be prepared by effecting reaction between a thienylhalogenosilane with an alcohol corresponding to the formula ROH where R is a monovalent saturated, aliphatic hydrocarbon radical, many examples of which have been given previously. Thus, thienyltriethoxysilane may be prepared by effecting reaction at from room temperature to about 100° C. between thienyltrichlorosilane and ethyl alcohol.

In preparing the thienylhalogenosilanes or the thienylalkoxysilanes by the Grignard method, substantially anhydrous conditions should be employed in order to prevent hydrolysis of the hydrolyzable thienyl silanes thus resulting in undue losses of the monomeric silanes. Such losses generally comprise thienyl polysiloxanes.

In order that those skilled in the art may better understand how the present invention may be practiced, the following examples are given by way of illustration and not by way of limitation. All parts are by weight.

Example 1

Into a three-necked flask equipped with stirrer, reflux condenser, and dropping funnel were placed 175 grams (1.0 mol) $SiCl_4$ and 200 ml. anhydrous ether. To this vigorously stirred solution (under anhydrous conditions was added over a period of one hour 470 ml. of a filtered ether solution of 2-thienyl magnesium bromide containing 1.2 mols of the Grignard reagent and prepared by adding 2-thienyl bromide to an anhydrous ethyl ether mixture of magnesium. The addition of the Grignard reagent was accompanied by spontaneous refluxing and deposition of solid matter. After the addition was completed the reaction mixture was heated at reflux temperature with stirring for three hours. The precipitated magnesium salts were separated by filtration, washed with anhydrous ether, the latter being combined with the filtrate. The filtrate and ether washings were fractionally distilled to yield 118 grams (0.54 mol) of 2-thienyltrichlorosilane boiling at 196–197° C. at atmospheric pressure and containing 48.5 per cent hydrolyzable chlorine (49.0 per cent theoretical hydrolyzable chlorine). This represented a 54 per cent yield. The compound had a melting point of about −45° C. and a density at 25° C. of 1.41. Analysis of the compound showed it to contain 14.7 per cent sulfur and 12.2 per cent silicon (theoretical: S=14.7%; Si=12.9%).

Another fraction in the distillation comprising 44 grams (0.17 mol) in weight, in a 17 per cent yield, was identified as di-(2-thienyl)-dichlorosilane boiling at 305–8° C. at atmospheric pressure, containing 26.3 per cent hydrolyzable chlorine (26.7 per cent theoretical hydrolyzable chlorine), and having a density of 1.39 at 25° C.

Di-(2-thienyl)-dichlorosilane was also prepared using the general procedures described above through the interaction of an ether solution containing 486 grams (2.6 mols) of 2-thienyl magnesium bromide with 221 grams (1.3 mols) $SiCl_4$ to give 139 grams (0.52 mol), in a 40 per cent yield, of di-(2-thienyl)-dichlorosilane boiling at 181° C. at 22 mm. and containing 25.6 per cent hydrolyzable chlorine.

Example 2

Tri-(2-thienyl)-chlorosilane was prepared by effecting reaction, under the same conditions employed in Example 1 between an ether solution containing 486 grams (2.6 mols) of 2-thienyl magnesium bromide and 146 grams (0.86 mol) $SiCl_4$. In this case the reaction mixture was refluxed for 16 hours, and fractionally distilled to yield 53 grams (0.17 mol), in a 20 per cent yield, of tri-(2-thienyl)-chlorosilane boiling at 190–205° C. at 1 mm. and containing about 9.9 per cent hydrolyzable chlorine (theoretical 11.4 hydrolyzable chlorine).

It will, of course, be apparent to those skilled in the art that similar derivatives of thienylhalogenosilanes as, for instance, the various thienylbromosilanes (e. g., 2-thienyltribromosilane, di-(2-thienyl)-dibromosilane and tri-(2-thienyl)-bromosilane, etc.), thienylfluorosilanes (e. g., 2-thienyl trifluorosilane, di-(2-thienyl)-difluorosilane, tri-(2-thienyl)-fluorosilane, etc.), etc., may be prepared by employing instead of the $SiCl_4$ employed in the foregoing examples, for instance, $SiBr_4$, $SiF_4$, etc.

Example 3

To 300 grams (1.45 mols) ethyl orthosilicate dissolved in 500 ml. of anhydrous ethyl ether was added with stirring over a period of several hours an ethyl ether solution containing 598 grams (3.2 mols) 2-thienyl magnesium bromide prepared using the usual Grignard method from 2-bromothiophene and magnesium. During addition there was slight refluxing of the reaction mixture. After all the Grignard reagent had been added, the reaction mixture was heated to reflux for several hours with stirring and the ethyl ether then removed by distillation. The residue was heated under vacuum at 300° C. to yield about 479 grams of distillate from which was isolated by distillation in a Vigreaux column 200 grams of crude product. Careful fractional distillation resulted in the isolation of 84 grams (0.34 mol), 24 per cent yield, of 2-thienyltriethoxysilane $[(2-C_4H_3S)Si(OC_2H_5)_3]$, boiling at 150° C. at 50 mm., having a density at 20° C. of 1.050, and a refractive index $n_D^{20} = 1.4659$, and another compound di-(2-thienyl)-diethoxysilane $$[(2-C_4H_3S)_2Si(OC_2H_5)_2]$$

24 grams (0.084 mol), 6 per cent yield, boiling at 209° C. at 50 mm. and having a refractive index $n_D^{20} = 1.5401$.

Analysis of the foregoing two ethoxy derivatives showed the following:

|  | Percent Carbon | | Percent Hydrogen | | Percent Sulfur | |
|---|---|---|---|---|---|---|
|  | Found | Calc. | Found | Calc. | Found | Calc. |
| 2-thienyltriethoxysilane | 49.5 | 48.7 | 7.9 | 7.4 | 13.1 | 13.0 |
| Di-(2-thienyl)-diethoxysilane | 49.7 | 50.7 | 6.2 | 5.7 | 22.5 | 22.6 |

The tri-(2-thienyl)ethoxysilane was probably present in small amounts in the reaction mixture. However, this compound can be prepared in better yields by reacting 2-thienyl magnesium bromide in the usual manner employed for Grignard reactions with, for example, di-(2-thienyl)-diethoxysilane. Another method for preparing tri-(2-thienyl)ethoxysilane comprises effecting reaction between ethyl alcohol and a tri-(2-thienyl)halogenosilane, e. g., tri-(2-thienyl)chlorosilane. It will, of course, be understood, as pointed out previously, that the foregoing other two alkoxy derivatives of the 2-thienylsilanes may be obtained by reacting the corresponding 2-thienylhalogenosilanes with ethyl alcohol.

In addition to the thienylethoxysilanes prepared above, it will be apparent that other alkoxysilanes containing a 2-thienyl radical attached to the carbon atom by a carbon-silicon linkage may also be made by effecting reaction between a 2-thienyl Grignard reagent such as 2-thienyl magnesium bromide and silicates corresponding to the general formula $(RO)_4Si$ where R is a saturated aliphatic radical, for example, methyl, propyl, butyl, isobutyl, hexyl, 2-ethylhexyl, decyl, octadecyl, etc., radicals. If desired, R may be an unsaturated aliphatic radical, for example, the vinyl, allyl, methallyl, isopropenyl, etc., radicals.

Another method for preparing other 2-thienyl-alkoxysilanes comprises effecting reaction between the corresponding 2-thienylhalogenosilane with the required alcohol for producing the particular alkoxysilane desired. Thus, one may employ, in addition to the ethyl alcohol described previously, such other alcohols as, for instance, methanol, propanol, isopropanol, butanol, hexanol, 2-ethylhexanol, decanol, octadecanol, etc.

What I claim as new and desire to secure by Letters Patent of the United States is:

Di-(2-thienyl)-dichlorosilane.

PHILIP A. DI GIORGIO.

References Cited in the file of this patent

UNITED STATES PATENTS

| Number | Name | Date |
|---|---|---|
| 2,238,669 | Wiley | Apr. 15, 1941 |
| 2,381,138 | Patnode | Aug. 7, 1945 |
| 2,460,457 | Hyde | Feb. 1, 1949 |
| 2,468,162 | Hyde | Oct. 25, 1949 |

OTHER REFERENCES

Krause et al., Berichte Deut. Chem. Gesel., vol. 62, 1929, pp. 1710–1712.

Steinkopf, Die Chemie des Thiophens, Dresden, 1941, p. 125.

Kochow, "Chemistry of Silicones," Wiley, 1946, pp. 93 and 94.

Steinkopf, Die Chemie des Thiophens, pp. 19 and 125, Steinkopf, Dresden, 1941.

Post, Silicones and Other Organic Silicon Compounds, pp. 32, 67, 171, 181, Reinhold Pub. Co., N. Y., 1949.

Whitmore, Organic Chemistry, pp. 884, 893, Van Nostrand, N. Y., 1937.

Richter, Organic Chemistry, pp. 649, 650, Wiley, N. Y., 1938.

Powers, Advancing Fronts in Chemistry, vol II, page 33, Reinhold Pub. Co., N. Y., 1946.

Steinkopf, Die Chemie des Thiophens, page 21, Edwards Lithoprint, 1941.